UNITED STATES PATENT OFFICE

1,999,341

HYDROXYCARBAZOLE COMPOUNDS

Friedrich Muth, Leverkusen-I. G. Werk, Germany, assignor to General Aniline Works, Inc., New York, N. Y., a corporation of Delaware No Drawing. Application December 30, 1931, Serial No. 584,010. In Germany January 12, 1931

4 Claims. (Cl. 260—46)

The present invention relates to hydroxycarbazole compounds, more particularly it relates to compounds which may be represented by the probable general formula:

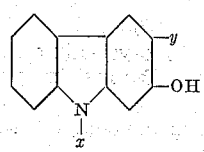

wherein $x$ stands for the radicle of a hydrocarbon, for example, for alkyl, such as methyl, ethyl, propyl, butyl, isobutyl, amyl and the like, or aralkyl, such as benzyl in which the benzene nucleus may bear substituents, for instance alkyl, or finally $x$ represents aryl, such as a hydrocarbon radicle of the benzene or naphthalene series, and $y$ stands for hydrogen or a carboxylic acid group.

The 2-hydroxycarbazoles of the above identified formula, in which $y$ stands for hydrogen, are obtainable by starting with 2-hydroxycarbazole, and substituting the hydrogen atoms of the hydroxy group and of the imino group by hydrocarbon radicles of the kind identified by figure "$x$" in the above formula, according to known methods, for example, by the action of the corresponding chloride of the hydrocarbon upon 2-hydroxycarbazole in the presence of an acid-binding agent. By splitting up the ether group in the 2-position of the carbazole, the 2-hydroxycarbazole compounds substituted in the imino group are obtained. The splitting up of the ether group can be performed according to various methods, for example, by heating the carbazole compounds substituted in the hydroxy- and the imino-group by hydrocarbon radicles in an inert solvent, such as benzene, carbon-disulfide, carbon-tetrachloride or the like, with a metal-chloride used in the Friedel-Craft's reaction, such as AlCl₃, ZnCl₂ or the like, or by heating the compounds with hydrochloric, hydrobromic or hydroiodic acid, in a solvent, such as glacial acetic acid or acetic anhydride, or finally by melting the disubstituted 2-hydroxycarbazole compounds with a caustic alkali.

The compounds of the above identified formula in which $y$ stands for a carboxylic acid group are obtainable by causing carbon-dioxide to react upon the corresponding compounds in which $y$ stands for hydrogen in the presence of a caustic alkali under superatmospheric pressure and at elevated temperature. Instead of working with a mixture of the N-substituted 2-hydroxycarbazole with a caustic alkali, there can be started with an alkali metal salt of the N-substituted 2-hydroxycarbazole in the carbonization process, if desired with the addition of an alkali metal carbonate.

My compounds are generally colorless, well-crystallizing substances, soluble in aqueous alkalies, from which they are reprecipitated by the addition of mineral acids, and are valuable intermediate products in the manufacture of dyestuffs.

The invention is illustrated by the following examples, without being limited thereto:

*Example 1.*—50 parts by weight of N-methyl-2-ethoxycarbazole (obtained by the action of dimethylsulfate on 2-ethoxycarbazole in boiling acetone; needles, melting point 85° C.), and 150 parts by weight of AlCl₃ are heated to boiling together with 200 parts by weight of benzene until the evolution of hydrochloric acid ceases. After 2½ hours the reaction is complete. After cooling, the mixture is poured on ice and rendered strongly acid with hydrochloric acid. Benzene is added and the two layers are separated. The benzene solution is shaken with warm dilute caustic soda lye. The alkaline extracts are acidified, the precipitate is filtered off and washed with water. The N-methyl-2-hydroxycarbazole of the following formula:

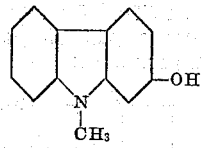

crystallizes from alcohol or toluene in needles melting at 167–168° C.

From N-methyl-2-methoxycarbazole the same product results.

*Example 2.*—100 parts by weight of N-ethyl-2-ethoxycarbazole (obtainable by ethylating 2-ethoxycarbazole; solid leaflets from alcohol, melting point 85° C.) and 300 parts by weight of AlCl₃ are heated to boiling together with 150 parts by weight of benzene until the evolution of hydrochloric acid ceases. The mixture is worked up as described in Example 1. The N-ethyl-2-hydroxycarbazole of the following formula:

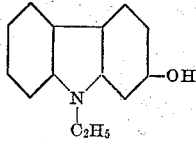

crystallizes from diluted alcohol in colorless needles of the melting point 109–110° C.

*Example 3.*—100 parts by weight of N-methyl-2-ethoxycarbazole are dissolved in 2000 parts by weight of glacial acetic acid, saturated with hydrogen bromide and heated in a pressure vessel for 14 hours to 100° C. Then the mixture is diluted with water and the precipitate sucked off is purified from water and soda lye by redissolving. The product obtained is identical to that described in Example 1.

In an analogous manner the N-phenyl-2-hydroxycarbazole of the following formula:

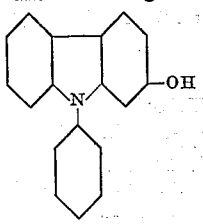

is obtained from N-phenyl-2-ethoxycarbazole.

*Example 4.*—50 parts by weight of N-methyl-2-methoxycarbazole (obtained by methylating 2-hydroxycarbazole to form 2-methoxycarbazole, melting point 235° C., and methylating the 2-methoxy-compound with dimethylsulfate in boiling acetone to form the N-methyl-2-methoxycarbazole; after recrystallization from ligroine obtained in form of needles of the melting point 104° C.) are introduced into 5 times its weight of molten caustic soda. The reaction mass is slowly heated to 300° C. while stirring, and kept at this temperature for ½ hour. After cooling, the melt is dissolved in water and acidified with hydrochloric acid. The product obtained, which is identical with that obtained according to Example 1, is filtered and dried.

*Example 5.*—19.7 parts by weight of N-methyl-2-hydroxycarbazole are stirred together with 13.6 parts by weight of a 30% caustic soda lye, and the water is removed by heating. In an autoclave the sodium salt is mixed with glass beads and then heated for 6 hours at 240–250° C. (temperature of the bath) in an atmosphere of carbon-dioxide under a pressure of 15 atmospheres. The cooled reaction product is extracted with boiling water, filtered and unchanged hydroxycarbazole is precipitated with $CO_2$. On acidification of the filtrate, the new carboxylic acid having in its free state the following formula:

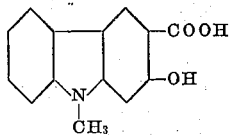

precipitates. It crystallizes from toluene or alcohol in colorless needles of the melting point 239° C. The alcoholic solution yields a blue coloration on the addition of ferric chloride.

In an analogous manner the N-phenyl-2-hydroxycarbazole-3-carboxylic acid of the following formula:

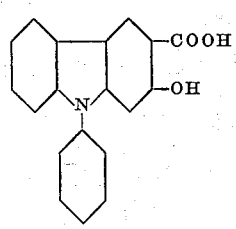

is obtainable from N-phenyl-2-hydroxycarbazole.

*Example 6.*—12.5 parts by weight of N-methyl-2-hydroxycarbazole and 40 parts by weight of calcined potash are heated in an autoclave during 8 to 10 hours at a temperature of 150° C. in an atmosphere of carbon-dioxide under a pressure of 15 atmospheres. The reaction product is extracted with boiling water and worked up in an analogous manner to that described in Example 5. The new acid crystallizes from toluene or alcohol in colorless needles of the melting point 239–240° C. and is identical with that obtained according to Example 5.

*Example 7.*—38 parts by weight of N-ethyl-2-hydroxycarbazole (needles from diluted alcohol, melting point 109–110° C.) are converted according to known methods into their potassium salt. This is mixed with 100 parts by weight of potassium carbonate. In an autoclave the mass is heated in an atmosphere of carbon-dioxide for 3 to 4 hours to 210–220° C. and maintained for 8 to 10 hours at 40–60 atmospheres. The cooled reaction product is extracted with boiling water, filtered and acidified with mineral acid. The new carboxylic acid having in its free state the following formula:

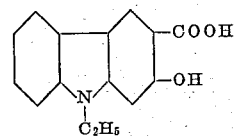

is precipitated. It crystallizes from toluene in colorless needles of the melting point 229° C.

I claim:

1. Hydroxycarbazole compounds of the general formula:

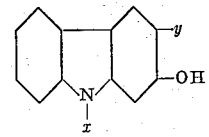

wherein $x$ stands for the radicle of a hydrocarbon of the group consisting of alkyl, benzyl and phenyl, and $y$ stands for hydrogen or a carboxylic acid group, being generally colorless, well-crystallizing substances, soluble in aqueous alkalies, from which they are reprecipitated by the addition of mineral acids, and being valuable intermediate products in the manufacture of dyestuffs.

2. Hydroxycarbazole compounds of the general formula:

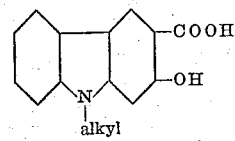

being generally colorless, well-crystallizing substances, soluble in aqueous alkalies, from which they are reprecipitated by the addition of mineral acids, and being valuable intermediate products in the manufacture of dyestuffs.

3. N-methyl-2-hydroxycarbazole-3-carboxylic acid of the formula:

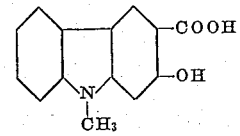

being a well-crystallizing substance of the melting point 239° C. and being a valuable intermediate product in the manufacture of dyestuffs.

4. N-ethyl-2-hydrocarbazole-3-carboxylic acid of the following formula:

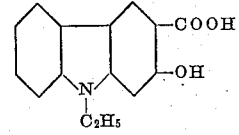

being a well-crystallizing substance of the melting point 229° C., and being a valuable intermediate product in the manufacture of dyestuffs.

FRIEDRICH MUTH.